United States Patent

[11] 3,570,354

| [72] | Inventors | Homer N. Grillot<br>Naperville;<br>Stuart D. Pool, Wheaton, Ill. |
|---|---|---|
| [21] | Appl. No. | 778,158 |
| [22] | Filed | Nov. 22, 1968 |
| [45] | Patented | Mar. 16, 1971 |
| [73] | Assignee | International Harvester Company<br>Chicago, Ill. |

[54] GUIDED STATIONARY KNIFE FOR DOUBLE SHEAR KNIFE
4 Claims, 8 Drawing Figs.

[52] U.S. Cl.................................................. 83/592,
83/594, 83/902, 289/14
[51] Int. Cl.................................................. B23d 31/00
[50] Field of Search.......................................... 289/14, 13,
11; 83/591—596, 902

[56] References Cited
UNITED STATES PATENTS

| 1,143,285 | 6/1915 | Koella............................ | 83/596X |
| 3,101,963 | 8/1963 | Sullivan et al. ................ | 289/11 |
| 3,370,875 | 2/1968 | Grillot........................... | 289/14 |

*Primary Examiner*—James M. Meister
*Attorney*—Noel G. Artman

ABSTRACT: A twine cutting mechanism for balers comprising a cord holder, a rotating blade mounted on the cord holder, a guide axially spaced from the cord holder, and a stationary blade. The spacing between the guide and the rotating blade is such to receive the stationary blade as the cord holder is rotated from its home position to its holding position. The guide acting on the stationary blade maintains the cutting edges in alignment.

Patented March 16, 1971
3,570,354
4 Sheets-Sheet 1
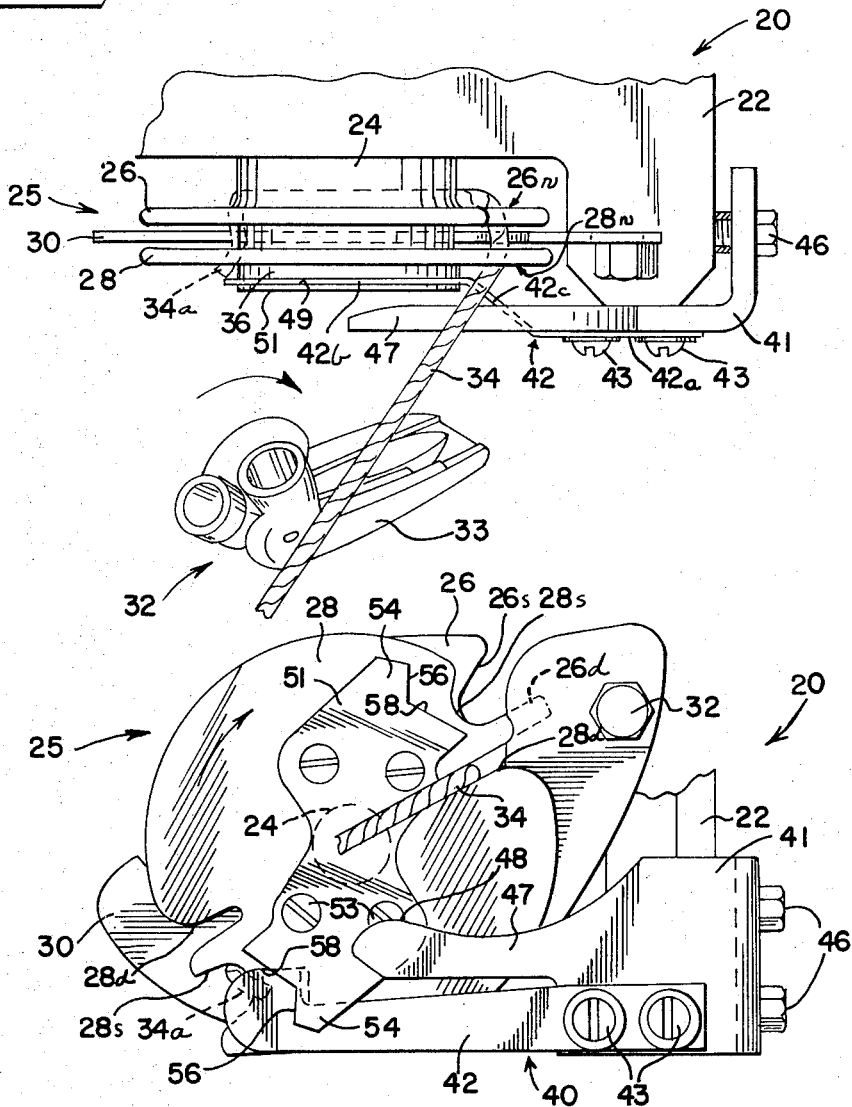
INVENTORS
HOMER N. GRILLOT
STUART D. POOL
BY Neal C. Johnson
ATT'Y.

Patented March 16, 1971

INVENTORS
HOMER N. GRILLOT
STUART D. POOL

BY Neal C. Johnson
ATT'Y.

Patented March 16, 1971
3,570,354
4 Sheets-Sheet 3
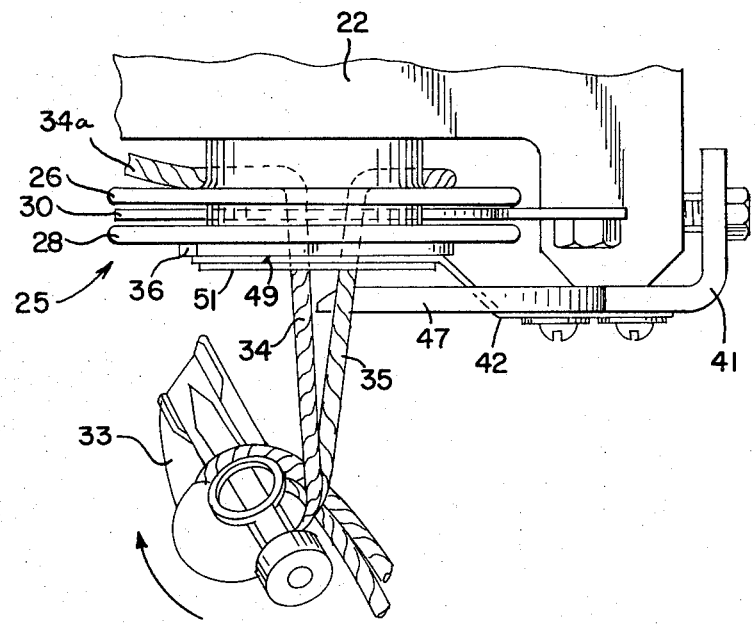
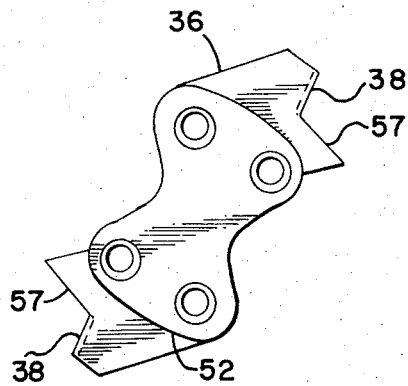
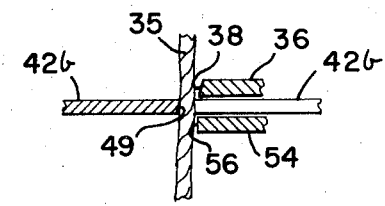
INVENTORS
HOMER N. GRILLOT
STUART D. POOL
BY Neal C. Johnson
ATT'Y.

Patented March 16, 1971

INVENTORS
HOMER N. GRILLOT
STUART D. POOL
BY Neal C. Johnson
ATT'Y.

3,570,354

GUIDED STATIONARY KNIFE FOR DOUBLE SHEAR KNIFE

BACKGROUND AND SUMMARY OF THE INVENTION

The present invention relates generally to cutting mechanisms used in twine knotters and more particularly to an improved cutting mechanism of the type disclosed in U.S. Pat. No. 3,370,875 issued to Homer N. Grillot on Feb. 27, 1968 for Twine Knotter.

The cutter mechanism described in the aforementioned patent may be tying as a double shear knife. Briefly, the mechanism includes a stationary blade fixed to the knotter frame and a rotating blade mounted on the cord holder assembly. In operation, twine is carried by the cord holder assembly from a twine receiving position to a twine holding position, the two positions being 180° angularly displaced. As the cord holder assembly moves between these two positions, the rotating blade slidingly passes over the stationary blade and the knife edges provided on each blade shears the twine. The two blades are geometrically positioned relative to the cord holder assembly and the knotter hook so that the cutting action occurs at the proper time in the tying cycle. In order to resist the separation force inherent in the shearing action, the stationary blade must be preloaded to provide a bias force against the rotating blade. Thus, it is apparent that the preloading requirement is critical to the proper operation of the cutting mechanism, requiring mounting means for providing the right amount of preload force. Furthermore, as the sliding surfaces become worn the preloading force diminishes changing the cutting characteristic of the mechanism.

In addition to the foregoing, it has been found that the efficiency of the twine-cutting step is affected by the attitude or orientation of the twine relative to the cutting edge. In conventional cutting mechanisms the twine is often disposed at an acute angle across the cutting blade. This orientation increases the biasing forces as well as produces a tendency for the twine to slip across the cutting edge resulting in a ragged cut.

The general purpose of the present invention is to provide a knotter with a guided cutting mechanism and thereby eliminate the necessity of preloading the stationary blade. Elimination of the requirement to preload the stationary blade permits the use of a flexible knife in place of the rigid platelike knife formerly required. The thin flexible knife is less costly and is easily mounted on the knotter.

A further purpose is to provide a knotter with means for guiding and retaining the twine in an attitude relative to the cutting edges resulting in sharp clean cuts and substantial reduction in biasing forces tending to separate the cutting edges.

Briefly, the present invention contemplates the use of a guide cooperatively arranged with the rotating knife to restrict lateral movement of the stationary blade during the cutting phase of the typing cycle. In operation, the guide opposes the separation force tending to separate the two blades during the cutting action. Moreover, the guide is arranged to assist in orienting the twine into a position facilitating efficient shearing thereof.

The objects of this invention may be summarized as follows: To improve the reliability of the double shear knife of twine knotters; to provide a knife guide operative to maintain the knives in proper cutting relation; and to orient the twine into a position facilitating efficient shearing action.

DESCRIPTION OF THE DRAWINGS

FIG. 1 is a top plan view of the twine knotter according to the present invention in its home position;

FIG. 2 is a side elevational view of the knotter mechanism of FIG. 1 with portions broken away for convenience of illustration;

FIG. 4 is a top plan view similar to FIG. 1 with the assembly shown at a particular stage in the tying cycle;

FIG. 7 is a plan view of the rotating blade shown detached from the knotter; and FIG. 8 is a fragmentary sectional view taken in the direction of arrows 8—8 of FIG. 6.

DESCRIPTION OF THE PREFERRED EMBODIMENT

Figure 3:
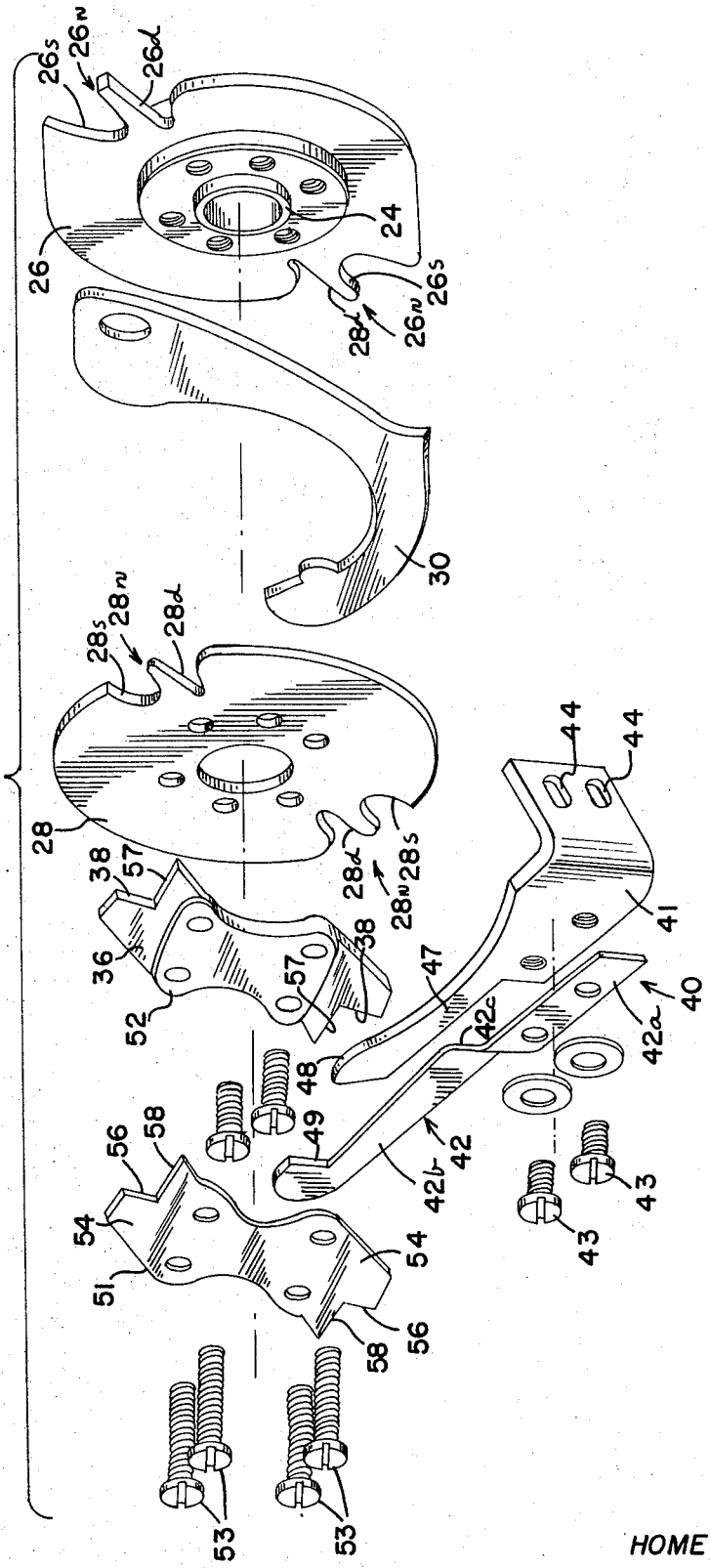
FIG. 3 is an exploded view of the cord holder assembly shown in relation to the cutter mechanism of this invention.

Referring now to the details of the mechanism shown in FIGS. 1 and 2, a twine knotter, of the type disclosed in U.S. Pat. No. 3,101,963 issued to Sullivan et al. is illustrated in its home position, i.e., that position the elements thereof assume before initiating the tying of a knot. The knotter mechanism which is generally indicated at 20 is provided with a frame 22 on which a shaft 24 is rotatably mounted. A cord holder, shown generally as 25, is carried by the shaft 24, and includes a rear disc 26 and a front disc 28 (see FIG. 3). Each disc is provided with two sets of notches indicated generally at 26n and 28n, with each set spaced 180° apart. The front disc 28 has shallow notches 28s and deep notches 28d and, similarly, the rear disc has a shallow notch 26s and a deep notch 26d. A keeper blade 30, pivotally mounted on the frame 22 by pin 32, is interposed between the front and rear discs 26 and 28 and cooperates therewith for holding the twine in a manner well known in the art.

With the cord holder 25 in the home position, as shown in FIGS. 1 and 2, the twine extends from the breastplate finger (not shown) where it is positioned to facilitate encirclement of the bale to be formed, and continues above and in close proximity to the knotter hook assembly, partially shown as 32, which includes a conventional billhook 33. The twine continues across both discs 26 and 28 wherein the twine, referred to as the disc twine 34, is received in the deep notches 26d and 28d and thence along the backside of the rear disc below the shaft 24. The disc twine 34 terminates at end portion 34a which is held by the coordinated action of the keeper blade 30 and discs 26 and 28.

A rotating blade 36 is affixed to the shaft 24 to rotate therewith and for convenience may be secured by the same fastening means which secure the front disc 28 to shaft 24.

A pair of knife edges 38, 38 is provided on the blade 36 and each edge is positioned a few degrees behind, relative to the direction of rotation, the shallow notch 28s of the front disc 28 (see FIGS. 1 and 7).

As best seen in FIG. 3, a stationary blade assembly 40 is arranged to cooperate with the rotating blade 36 to sever the twine delivered by the baler needle (not shown). The assembly 40 includes a rigid, platelike holder member 41 and a flexible blade 42 adapted to be mounted on the holder 41 by screws 43. The holder 41 is provided with slots 44 which receive bolts 46 for mounting assembly 40 on the frame 22 as shown in FIG. 2. An extension 47 of the holder 41 has a hump 48 formed in its outer end. The hump is positioned radially inwardly of the shallow notches 28s to effect the rendering action of the needle twine as described in the above-mentioned patent.

Returning to FIG. 1, the blade 42 has a portion 42a secured to the holder 41, a straight portion 42b extending generally parallel to the plane of the rotating blade 36, and a curved portion 42c interconnecting portions 42a and 42b. The distal end of portion 42b has formed therein a knife edge 49 extending transversely with respect to the path of twine rotation. The edge 49 is radially disposed to encounter the needle twine (shown as 35 in FIGS. 4, 5, and 6) carried in the shallow notches 26s, 28s, but to avoid the disc twine carried in the deep notches 26d and 28d as the discs 26 and 28 are rotated from the home to the holding positions. The straight portion 42b is disposed in close proximity to the rotating blade 36 so that the confronting edges 49 and 38 cooperate to effect the shearing action on the needle twine 35.

Since the stationary blade 42, contemplated by this invention, may be constructed of highly flexible material, means must be provided to oppose the separation force inherent in the shearing action. A flat platelike guide 51 secured to the rotating blade 36 and axially spaced therefrom by a spacer 52 which may be integrally formed with the rotating blade 36 (see FIG. 3) serves to engage the straight portion 42b (see FIG. 1) and thereby prevent deflection of the blade 42 caused by the separation force. The guide 51, rotating blade 36, and discs 26 and 28 are secured in assembled relation to the shaft 24 by a plurality of screws 53 (see FIG. 3).

The guide 51 has a pair of projections 54, 54 on each of which is formed a straight guide edge 56. The guide edges 56, 56 are aligned in spaced parallel relation with the knife edges 38, 38 so that as the stationary knife edge 49 is passed between the corotating guide 51 and blade 36, the needle twine 35 trapped therebetween is maintained in an attitude substantially at right angles across the blade 42, an attitude which favors the shearing action. The above relationship is best shown in FIG. 8. The projection 54 upon approaching the knife 42 passes in close proximity to the straight portion 42b of knife 42 (see FIG. 6). The knife 42, sandwiched between the guide 51 and rotating knife 36, is positioned to pass in the space separating the guide edge 56 and knife edge 38.

The rotating blade 36 and guide 51 are provided with parallel straight guiding edges 57 and 58, respectively, which form a obtuse angle with the knife edge 38 and guide edge 56, respectively. Now, as the rotating parts approach the stationary knife edge 49, a pocket, designated as 59 in FIG. 6, confines the needle twine 35. Thus, the needle twine 35 is constrained on four sides immediately prior to the cutting action.

In the twine knotter described in U.S. Pat. No. 3,370,875, the stationary blade was biased into sliding engagement with the rotating blade. Because of the control provided by the coordinating action of the guide 51 and the rotating blade 36 according to this invention, the bias force is not required. This greatly simplifies the problem of knife timing and furthermore permits the use of an inexpensive flexible knife 42.

Figure 5:
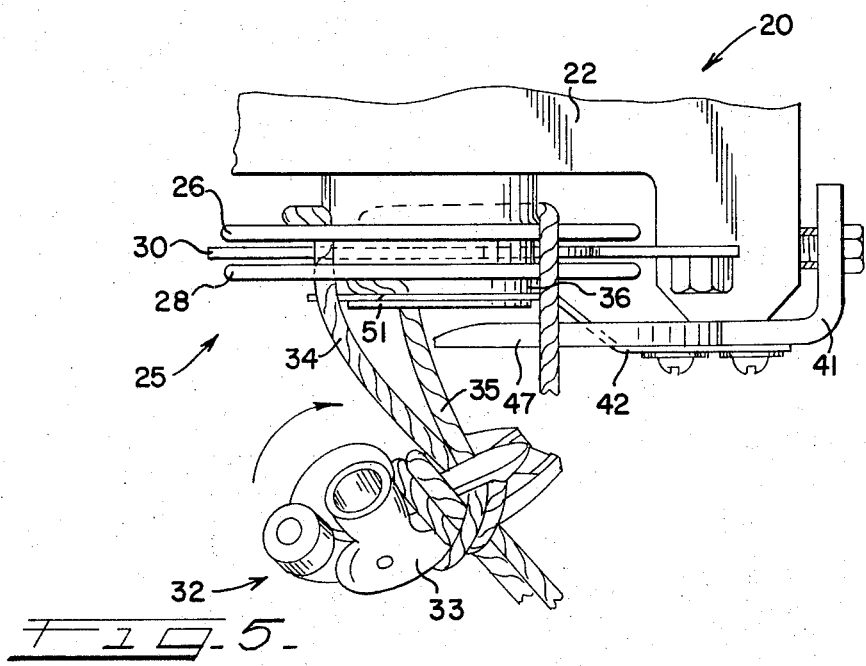
FIG. 5 is a top plan view similar to FIG. 4 with the assembly shown at a later stage in the tying cycle.
Figure 6:
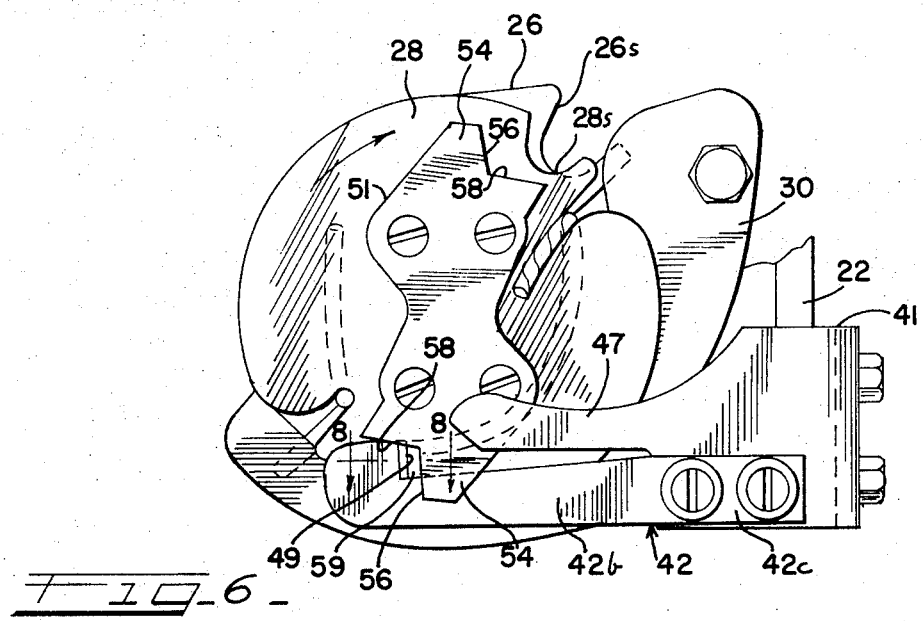
FIG. 6 is a side elevational view similar to FIG. 2 with the assembly shown at the stage in the tying cycle corresponding to FIG. 5.

The operation of the cutting mechanism of this invention will be described in connection with a conventional cord holder and with reference to FIGS. 2, 4, 5, and 6. In the home position of the knotter 20 (FIG. 2), the disc twine 34 has an end portion 34a held by the cord holder assembly 25. The twine extends around the back of disc 26 through the deep notches 26d and 28d and thence to the bale chamber (not shown) of the baler. Needle twine 35 is delivered by the needle and placed in the shallow notches 26s and 28s. The knotter hook assembly 32 begins rotating wrapping loops around the billhook 33 as shown in FIGS. 4 and 5. Just prior to this action, the cord holder 25 has begun turning. The needle twine 35 is thus carried in the shallow notches 26s and 28s from the home position toward the holding position 180° angularly removed therefrom. In this movement the needle twine 35 engages the hump 48 of the holder 41 causing the twine 35 to render from the needle. As the assembly approaches the holding position, the guide 51 and rotating blade 36 pass on opposite sides of the straight portion 42b as shown in FIG. 6. Further movement of the cord holder 25 forms the pocket 59 just before the knife edges 49 and 38 engage to effect the shearing action. The pocket 59 places the needle twine 35 in the optimum attitude for shearing (FIG. 8). The final increment of angular movement from the position indicated in FIG. 6 to the holding position indicated in FIG. 2 causes the rotating knife edge 38 to pass adjacent the stationary knife edge 49 shearing the needle twine 35. By this time the cord holder 25 has obtained a hold on the twine 35. Now, since the disc twine 34 has been released and the needle twine severed, the bale is completely bound and is discharged from the bale chamber by the formation of a succeeding bale. Rearward movement of the bound bale strips the knot from the billhook 33 in a manner well-known in the art.

Thus, it has been demonstrated that the present invention provides for a guided knife assembly which functions to positively sever the twine and to maintain the twine in an attitude favoring the severing action.

We claim:

1. In a twine knotter having a cord holder assembly and a cyclic rotatable shaft, a rotating blade having a first knife edge affixed to said shaft for rotation therewith, a stationary blade having a second knife edge, and means for positioning and retaining said twine between said edges to effect shearing of the twine as the rotating blade moves past said stationary blade, the improvement comprising: guide means acting upon said stationary blade for maintaining said stationary blade in sliding relation with said rotating blade as said rotating blade moves past said stationary blade, said guide means including a guide spaced axially from said rotating blade with reference to said shaft and corotatable therewith and having a portion extending radially outwardly from said shaft beyond said second knife edge, the spacing between said guide and said rotating blade being such as to receive said stationary blade as said guide and said rotating blade move therepast, whereby said guide bearing on said stationary blade maintains said second knife edge in cutting relation with said first knife edge.

2. The subject matter of claim 1, wherein said radially extending portion of said guide includes a guide edge disposed in parallel relation with said first knife edge, whereby the twine is engaged by said guide edge and said first knife edge to dispose the twine across said stationary blade at substantially right angles thereto facilitating shearing thereof.

3. The subject matter of claim 2, wherein said rotating blade and said radially extending portion of said guide each include a guiding edge extending from said first knife edge and said guide edge respectively, said first knife edge, guide edge, and guiding edges being disposed to entrap the twine across said second knife edge facilitating the shearing thereof.

4. In a twine knotter having a cord holder assembly and a cyclic rotatable shaft, a rotating blade having a first knife edge affixed to said shaft for rotation therewith, a stationary blade having a second knife edge, and means for positioning and retaining said twine between said edges to effect shearing of the twine as the rotating blade moves past said stationary blade, the improvement comprising: guide means acting upon said stationary blade for maintaining said stationary blade in sliding relation with said rotating blade as said rotating blade moves past said stationary blade, said guide means being coupled to said shaft for rotation therewith.